Oct. 31, 1950     B. W. NICKERSON, JR     2,528,165
RIGID TIRE CHAIN
Filed May 25, 1948
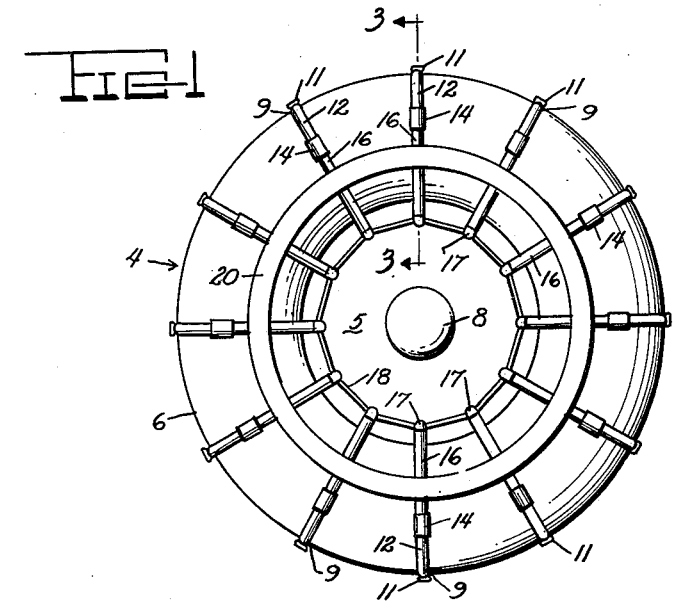
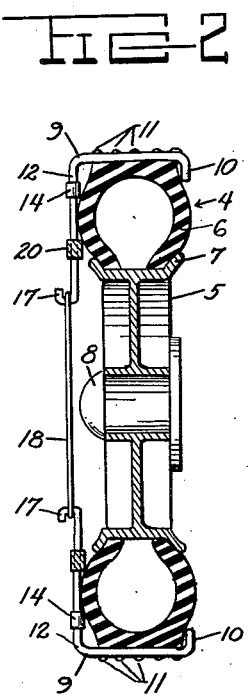
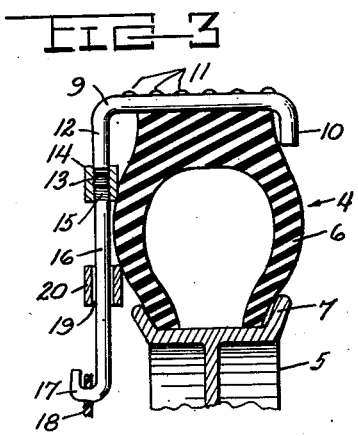
INVENTOR.
BRYAN W. NICKERSON, JR.
BY
McMorrow, Berman & Davidson
ATTORNEYS Patented Oct. 31, 1950

2,528,165

UNITED STATES PATENT OFFICE 2,528,165

RIGID TIRE CHAIN

Bryan W. Nickerson, Jr., Wilmington, Del.

Application May 25, 1948, Serial No. 29,090

1 Claim. (Cl. 152—226)

This invention relates to a rigid tire chain, and particularly to a tire chain system of the type in which a series of spaced traction members clasps a tire from one side thereof.

The main object of my invention is to provide a tire chain system or structure of the character indicated which may be applied in a few minutes to a tire from the outside of the wheel without jacking up the latter.

Another object is to have a tire chain system or structure which greatly increases the useful life of the system by providing for renewal of certain traction parts thereof.

A further object is to have such a tire chain system which also offers far greater traction with the road than conventional tire chains.

An ancillary object is to have a sturdy and durable tire chain system of the indicated type in which a series of guided radial bars or rods are provided at their outer ends with transverse traction members which are replaceable when worn, while the original guided radial bars are used with the new traction members thus applied.

It is also an object to have a tire chain system of the outlined character in which each guided radial bar or rod is individually movable or depressable by contact with the road and is resiliently connected to the other guided radial bars or rods in the system.

Still another object is to provide a tire chain structure which is free from the possibility of having any broken chain portion swinging about the wheel and slapping the fenders of a car.

Other objects and advantages of my invention will appear in further detail as the specification proceeds.

In order to bring out comprehensively the salient features of this invention, the latter is illustrated on the accompanying drawing forming part hereof, and in which:

Figure 1 is a side elevation of a wheel having a rigid tire chain system made according to the invention and embodying the same in a practical form applied to the tire upon said wheel;

Figure 2 is a vertical central section of the wheel and tire chain structure of Figure 1;

Figure 3 is an enlarged vertical section taken on line 3—3 in Figure 1.

In the three views, the same reference numerals indicate the same or like parts.

In the automotive field it is well known that pneumatic rubber tires lose traction when they are used upon the ground in wet weather and when considerable snow and ice are found on the streets where the car involved is driven, so that various expedients are often resorted to in order to improve traction and especially to prevent skidding.

Tire chains have been known for a long time and have often proven partially satisfactory, but they do have certain disadvantages which are unavoidable, one being that sooner or later some portions of a tire chain will break and begin to swing about a wheel in a noisy fashion and slap the fenders, and even threaten to tear the fender off the car if a hook portion of a link takes hold upon any projection on the inside of the fender. On the other hand, various appliances have been designed for mounting upon a wheel with portions gripping the tire in various positions and degrees, but such devices have frequently come short in tending to become displaced and ineffective.

After carefully considering this problem, I have found it quite feasible to design a novel rigid tire chain structure which includes certain conveniences and advantages, as will now be particularly set forth in detail.

Hence, in the practice of my invention, and referring again to the accompanying drawing, a pneumatic tire, generally indicated at 4, is mounted upon a wheel 5 and provided with the usual tread 6 while being retained in position upon the tire-gripping rim 7 of the wheel. The latter may be of more or less conventional construction and inasmuch as no portion of this invention resides in the nature thereof, further details are superfluous to mention regarding the same. Suffice it to state that in Figure 1, the outer side of the wheel is shown with the hub cap 8.

Upon the tread 6 of tire 4 are mounted a series of equidistantly-spaced traction or tread members 9, 9 transversely upon the tread 6 with a radially inwardly-directed hook 10 upon the inner side of the tire, while upon the outer surface of each of the transversely-disposed traction members 9 are located a group or series of small bars 11, 11 to provide sufficient traction with the road when each of such traction members comes into contact therewith. Upon the other end of the traction members 9 exposed upon the outer side of the wheel is a bent portion 12 which is also radially inwardly-directed in similar fashion to that of the other end hook 10 and having a threaded portion 13 screwed into an internally-threaded tubular member 14, or, as it may also be termed, a nut or a union, while through the other end of this same union or tubular member 14 the upper threaded end 15 of a radially-disposed bar or rod 16 is screwed so that for all practical purposes this rod or bar 16 will be rigid with the traction member 9 in each case. Each of the radially-disposed bars or rods 16 terminates at its inner end in a hook 17, all of the hooks 17 in the series and taken together surrounding the hub 8 of the wheel 5 at substantially the same distance therefrom. However, connecting all the hooks 17 upon the radially-directed rod 16 is an elastic rubber or plastic band 18 tending to draw the radial rods 16 inwardly toward the hub, and thereby drawing the traction members 9, 9, etc., inwardly upon tread 6 of the tire 4.

In order to maintain equidistant spacing between the traction members 9, 9 among themselves and also the radial rods or bars 16, 16, the latter extend slidably through apertures 19 in a ring 20. The arrangement is such that when the tire 4 is in contact with the road, the lowest traction member 9 will be shifted upwardly or radially inward toward hub cap 8 through the ring 20, slightly slackening the band 18 at the inner end or hook 17 of the respective rod 16, the small traction bars 11 serving to provide the requisite contact or traction with the road. As soon as the wheel has rotated sufficiently to liberate the particular traction member 9 from contact with the road, the next one in order is, of course, brought down into contact therewith and goes through the same cycle of movement, the release of the traction member in each case being caused by the tire itself expanding when released from contact with the pavement or road, with the result that the traction member thus freed from traction will again project radially outward and will cause the inner hook thereof to draw outwardly upon band 18. The mentioned traction bars 11 are relatively small, but are preferably welded or brazed on the traction members 9 to improve the traction and further prevent skidding and other undesirable effects. Due to the fact that the traction members are separable from the union members 14, they may be replaced when worn while still using the original radial rods 16 and ring 20, and also the elastic band 18 holding the hooks 17 in place, whereby to obtain maximum use of the device.

When this rigid chain system is to be applied to the wheel, this obviously occurs from the outer side thereof, the entire group of radial rods 16 with the ring 20 being placed against the side of the tire and each of the traction members 9 swung into place with the hook 10 clasping the far side or inner side of the tire. This is quickly performed without raising the wheel off the ground, or rotating it, by straddling the lower part of the tire in contact with the ground by two traction members 9 and placing successive members in position until the entire device is in place, while removal is simply a reversal of the foregoing proceeding. It is obvious that any metal that will serve the purpose may be used for making this tire chain structure, but steel is preferred above the other metals because of its durability and unusual accessibility on the market.

Manifestly, variations may be resorted to and parts and features may be modified or used without others within the scope of the invention, and especially the appended claim.

Having now fully described my invention, I claim:

An antiskid device for an automobile tire mounted upon a rim, comprising a rigid guide ring having equidistantly spaced radial openings and having a diameter substantially greater than the diameter of the inner edges of the sides of the tire, said guide ring being arranged upon one side of the tire and spaced radially outwardly of the rim to be free from contact therewith, L-shaped traction elements each of which includes a radial member and a transverse member to engage over the tread of the tire, each radial member being formed in separate inner and outer sections, the inner section being slidably mounted within the corresponding radial opening of the guide ring and extending radially inwardly and outwardly beyond the guide ring and provided at its inner end with a hook, an endles resilient loop common to all inner sections and engaging upon the hooks and serving to draw the inner sections inwardly, and a coupling element mounted upon each inner section and extending radially beyond the same and detachably connecting the inner section and its outer section, the arrangement being such that the coupling elements will engage the guide ring when the device is removed from the tire to prevent undue collapsing of the device and retain the parts in relative position for more convenient assembly upon the tire.

BRYAN W. NICKERSON, Jr.

REFERENCES CITED

The following references are of record in the file of this patent:

UNITED STATES PATENTS

| Number | Name | Date |
| --- | --- | --- |
| 2,212,076 | Rollings | Aug. 20, 1940 |
| 2,290,398 | Wellington | July 21, 1942 |
| 2,434,017 | Snedeker | Jan. 6, 1948 |